(12) United States Patent
Ogimoto

(10) Patent No.: US 12,138,967 B2
(45) Date of Patent: Nov. 12, 2024

(54) TIRE

(71) Applicant: Toyo Tire Corporation, Itami (JP)

(72) Inventor: Hiroki Ogimoto, Itami (JP)

(73) Assignee: Toyo Tire Corporation, Itama (JP)

( * ) Notice: Subject to any disclaimer, the term of this patent is extended or adjusted under 35 U.S.C. 154(b) by 0 days.

(21) Appl. No.: 17/529,408

(22) Filed: Nov. 18, 2021

(65) Prior Publication Data

US 2022/0161608 A1     May 26, 2022

(30) Foreign Application Priority Data

Nov. 20, 2020   (JP) ................................ 2020-193146

(51) Int. Cl.
| | |
|---|---|
| B29D 30/00 | (2006.01) |
| B60C 13/00 | (2006.01) |
| B60C 15/00 | (2006.01) |
| B60C 23/04 | (2006.01) |

(52) U.S. Cl.
CPC ........ B60C 13/004 (2013.01); B60C 15/0027 (2013.01); B29D 2030/0077 (2013.01); B29D 2030/0083 (2013.01); B60C 23/0493 (2013.01)

(58) Field of Classification Search
CPC .... B29D 2030/0083; B29D 2030/0077; B60C 13/0004; B60C 23/0493; B60C 2013/026
See application file for complete search history.

(56) References Cited

U.S. PATENT DOCUMENTS

| | | | |
|---|---|---|---|
| 8,430,142 | B2 | 4/2013 | Incavo et al. |
| 2004/0159383 | A1 | 8/2004 | Adamson et al. |
| 2006/0123899 | A1 * | 6/2006 | Nakao ................. B60C 23/0493 73/146 |
| 2006/0290505 | A1 * | 12/2006 | Conwell .......... G06K 19/07764 340/572.1 |
| 2007/0051453 | A1 * | 3/2007 | Majumdar .......... B60C 23/0493 156/123 |
| 2010/0212791 | A1 * | 8/2010 | Incavo ................ B60C 23/0493 235/487 |
| 2011/0259497 | A1 | 10/2011 | Borot et al. |
| 2015/0083811 | A1 | 3/2015 | Borot et al. |

(Continued)

FOREIGN PATENT DOCUMENTS

| | | | | |
|---|---|---|---|---|
| DE | 102018215458 A1 * | 3/2020 | | |
| EP | 906839 A2 * | 4/1999 | ............. | B60C 19/00 |

(Continued)

OTHER PUBLICATIONS

ESpaceNet Translation of EP3634784 (Year: 2022).*

(Continued)

*Primary Examiner* — Katelyn W Smith
*Assistant Examiner* — Alexander D Booth
(74) *Attorney, Agent, or Firm* — Maier & Maier, PLLC

(57) ABSTRACT

A tire includes: a pair of beads having a bead core and bead filler extending to an outer side in a tire-radial direction of the bead core; a carcass ply extending from one bead to another bead; an inner liner arranged at a tire inner cavity side of the carcass ply; and an electronic component unit pasted to a tire inner cavity side of the inner liner, in which the electronic component unit is arranged at a tire-radial direction position distanced at least 5.0 mm to the outer side in the tire-radial direction from a tire-radial direction outside end of the bead core.

13 Claims, 10 Drawing Sheets

(56) References Cited

U.S. PATENT DOCUMENTS

| | | | |
|---|---|---|---|
| 2015/0191053 A1* | 7/2015 | Shouyama | B60C 23/064 |
| | | | 152/152.1 |
| 2017/0355235 A1* | 12/2017 | Wei | B60C 23/0493 |
| 2018/0178593 A1 | 6/2018 | Shimomura | |
| 2019/0341673 A1 | 11/2019 | Destraves et al. | |
| 2020/0108671 A1* | 4/2020 | Hosomi | B60C 19/00 |
| 2021/0252815 A1* | 8/2021 | Bestgen | B29D 30/0061 |
| 2021/0271951 A1 | 9/2021 | Moon et al. | |

FOREIGN PATENT DOCUMENTS

| | | | | |
|---|---|---|---|---|
| EP | 3030434 A1 * | 6/2016 | | B60C 23/0493 |
| EP | 3634784 B1 * | 6/2021 | | B60C 23/0493 |
| FR | 3059606 A1 | 6/2018 | | |
| JP | H07-137510 A | 5/1995 | | |
| JP | 2000108621 A | 4/2000 | | |
| JP | 2006168473 A | 6/2006 | | |
| JP | 2018103931 A | 7/2018 | | |
| JP | 6594507 B1 * | 10/2019 | | B29D 30/0061 |
| JP | 2020055453 A | 4/2020 | | |
| JP | 2020528584 A | 9/2020 | | |
| JP | 2021112932 A | 8/2021 | | |

OTHER PUBLICATIONS

Ehmke. DE102018215458. ESpaceNet Machine Translation. 2020. (Year: 2023).*

Office Action issued on Jun. 25, 2024, in corresponding Japanese Application No. 2020-193146, 12 pages.

* cited by examiner

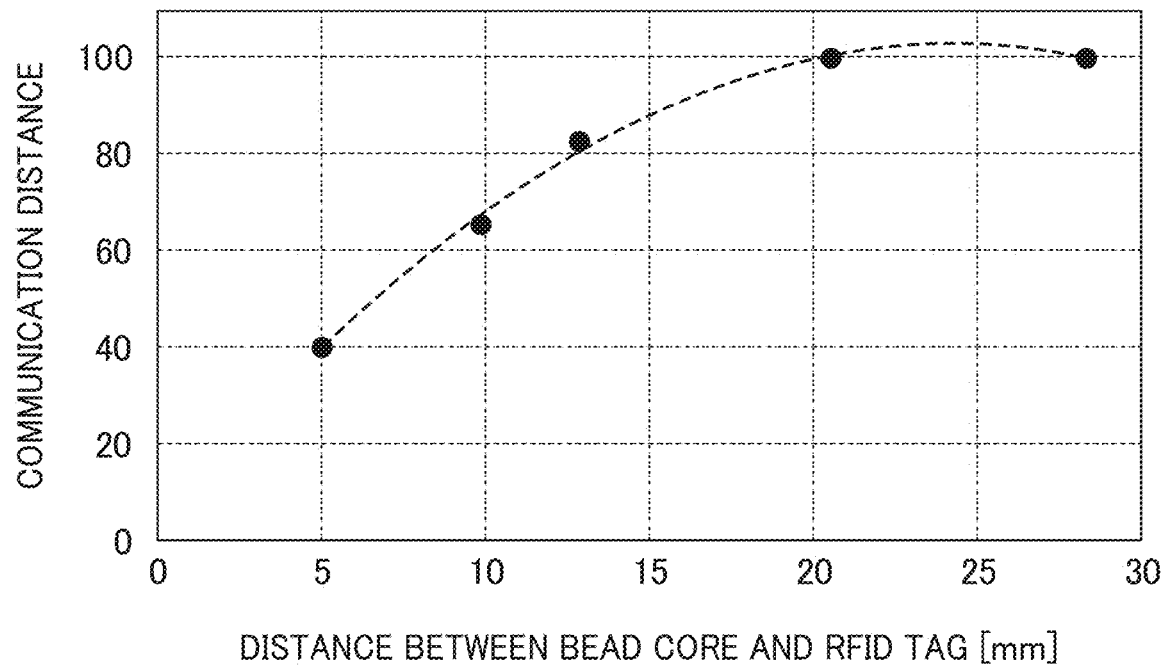

TIRE

This application is based on and claims the benefit of priority from Japanese Patent Application No. 2020-193146, filed on 20 Nov. 2020, the content of which is incorporated herein by reference.

FIELD

The present invention relates to a tire.

BACKGROUND

Conventionally, a tire embedding an electronic component such as an RFID tag has been known. With such a tire, it is possible to carry out production management of the tire, usage history management, etc. by the RFID tag embedded in the tire and a reader as external equipment carrying out communication. For example, Japanese Unexamined Patent Application, Publication No. H07-137510 discloses a tire made by arranging a transponder for obtaining information for identifying the tire on a tire inner circumferential side of a bead part.

SUMMARY

According to the technology shown in Patent Document 1, it is possible to embed a transponder without deviating from a predetermined position. In this regard, in the technology shown in Japanese Unexamined Patent Application, Publication No. H07-137510, the transponder serving as an electronic component unit is embedded in the neighborhood of a bead core. Then, the bead core is an annular member formed by wrapping around several times bead wires made of metal. Therefore, in the technology shown in Japanese Unexamined Patent Application, Publication No. H07-137510, there is a possibility of flaws in the electronic component unit occurring such as a decline in communication performance due to the adverse effects of the bead core made of metal.

The present invention has been made taking account of the above problem, and an object thereof is to provide a tire which can suppress the occurrence of flaws in an electronic component unit arranged in a tire.

A tire of the present invention includes: a pair of beads having a bead core and bead filler extending to an outer side in a tire-radial direction of the bead core; a carcass ply extending from one bead to another bead; an inner liner arranged at a tire inner cavity side of the carcass ply; and an electronic component unit pasted to a tire inner cavity side of the inner liner, in which the electronic component unit is arranged at a tire-radial direction position distanced at least 5.0 mm to the outer side in the tire-radial direction from a tire-radial direction outside end of the bead core.

According to the present invention, it is possible to provide a tire which can suppress the occurrence of flaws in an electronic component unit arranged in a tire.

BRIEF DESCRIPTION OF THE DRAWINGS

FIG. 5 is a view showing a relationship between a distance between a bead core and RFID tag, and the communication distance;

DETAILED DESCRIPTION OF THE EMBODIMENTS

First Embodiment

Figure 1:
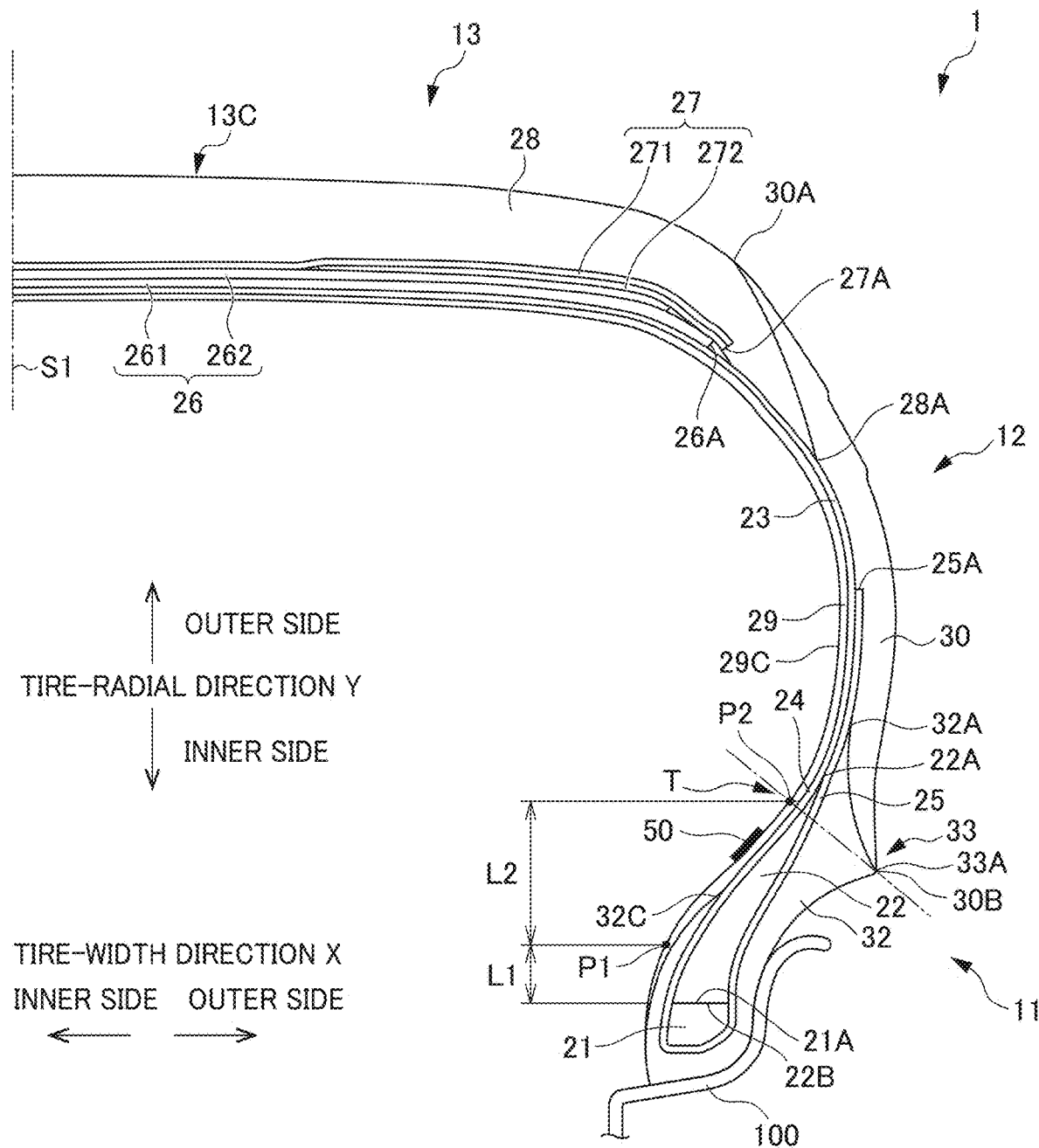
FIG. 1 is a view showing a half section in a tire-width direction of a tire according to a first embodiment.

Hereinafter, a first embodiment of the present invention will be explained while referencing the drawings. FIG. 1 is a view showing a half section in a tire-width direction of a tire 1 according to the present embodiment. Since the basic structure of the tire 1 is left/right symmetrical in the cross-section of the tire-width direction, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction.

Herein, tire-width direction is a direction parallel to the tire rotation axis, and is the left/right direction of the paper plane of the cross-sectional view in FIG. 1. In FIG. 1, it is illustrated as the tire-width direction X. Then, inner side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer side of tire-radial direction is a direction distancing from the tire rotation axis, and is the upper side of the paper plane in FIG. 1. Inner side of tire-radial direction is a direction approaching the tire rotation axis, and is the lower side of the paper plane in FIG. 1.

It should be noted that the cross-sectional view of FIG. 1 is a tire-width direction cross-sectional view (tire meridian axis cross-sectional view) in a state mounting the tire to a standard rim, and filling the standard internal pressure. It should be noted that standard rim indicates a rim serving as a standard decided by JATMA to correspond to the tire size. In addition, standard internal pressure is 180 kPa in the case of the tire being for a passenger vehicle, for example.

Figure 2:
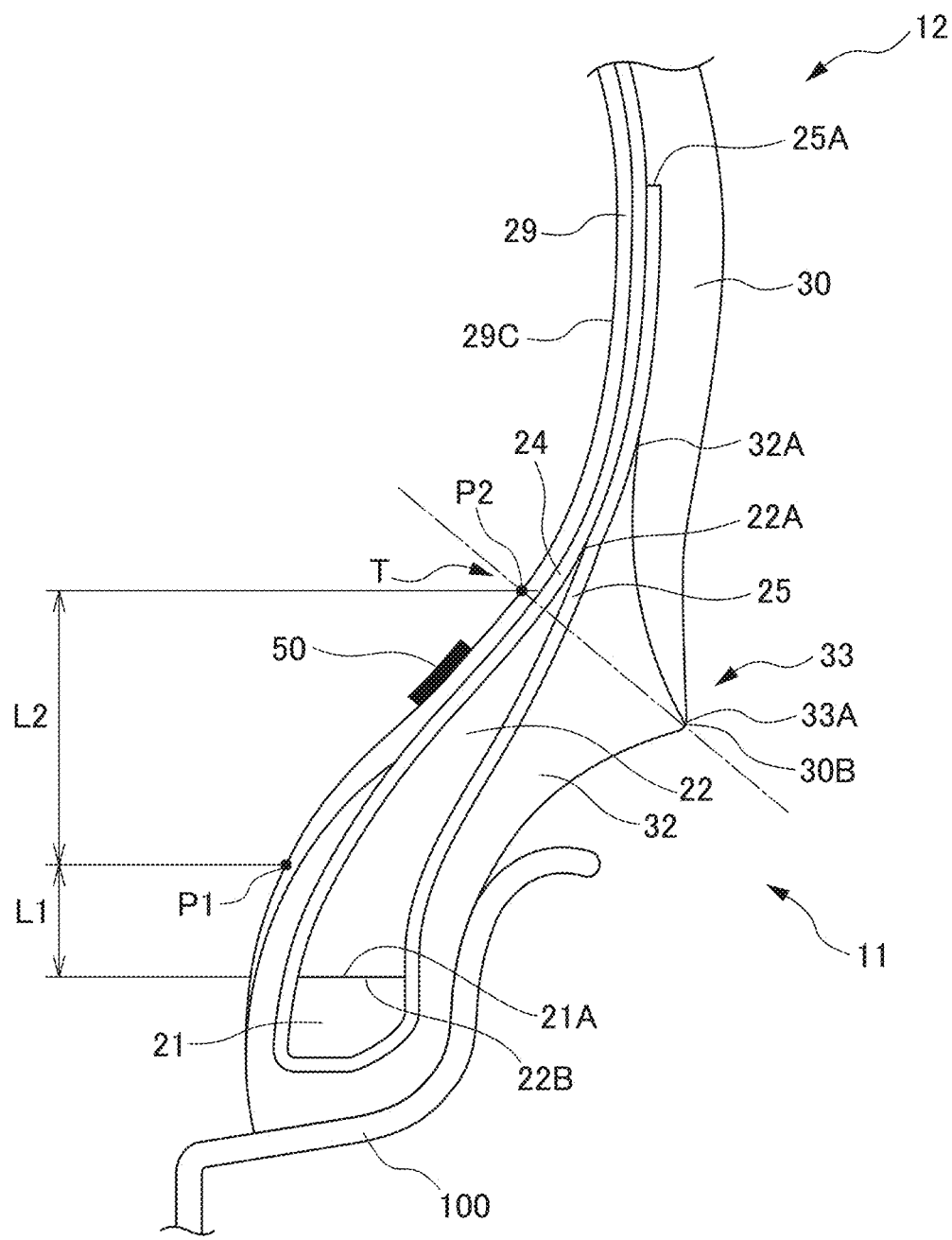
FIG. 2 is a partial enlarged cross-sectional view of the tire in FIG. 1.
Figure 8:
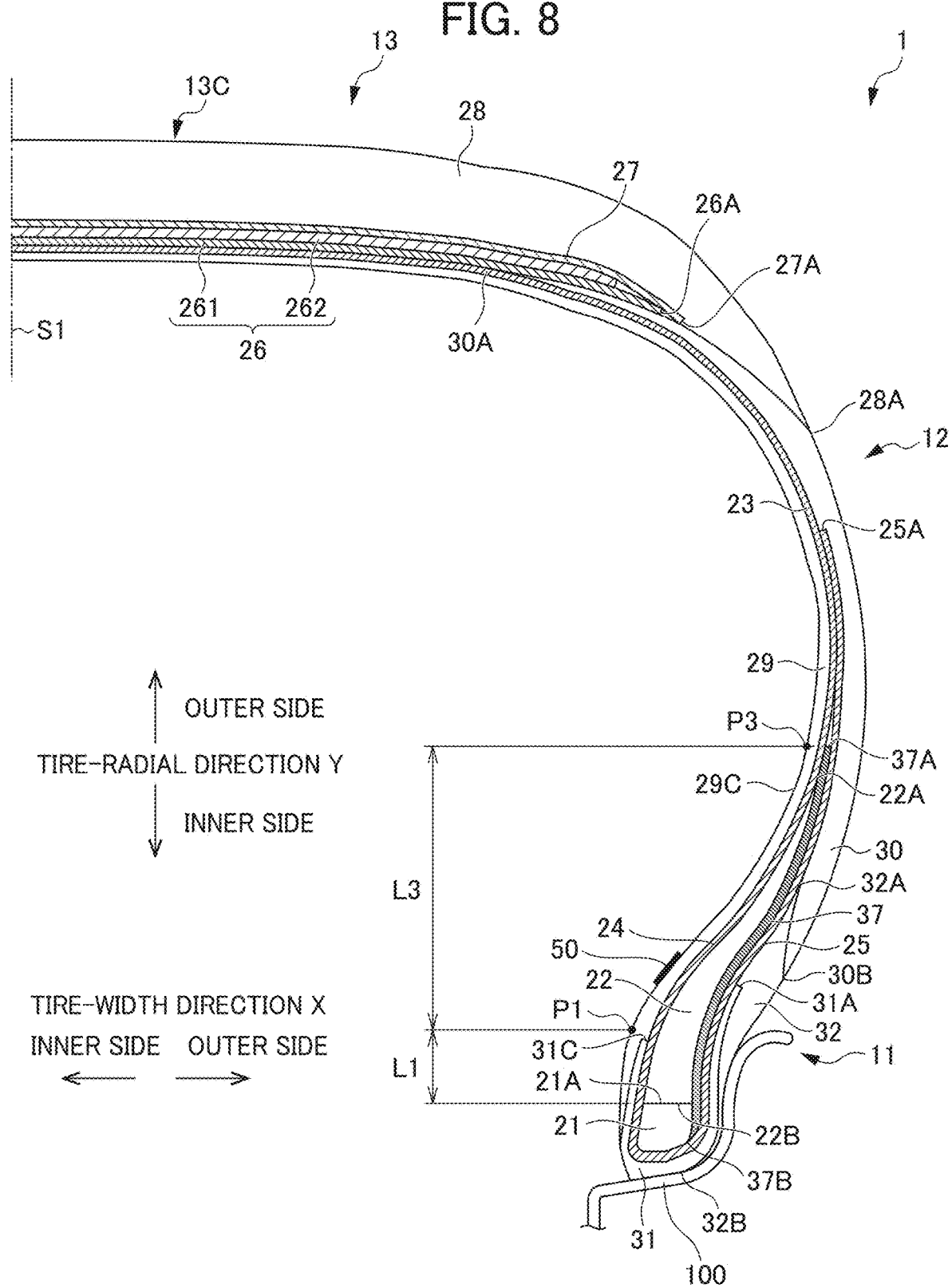
FIG. 8 is a view showing a half section in the tire-width direction of a tire according to a second embodiment.
Figure 9:
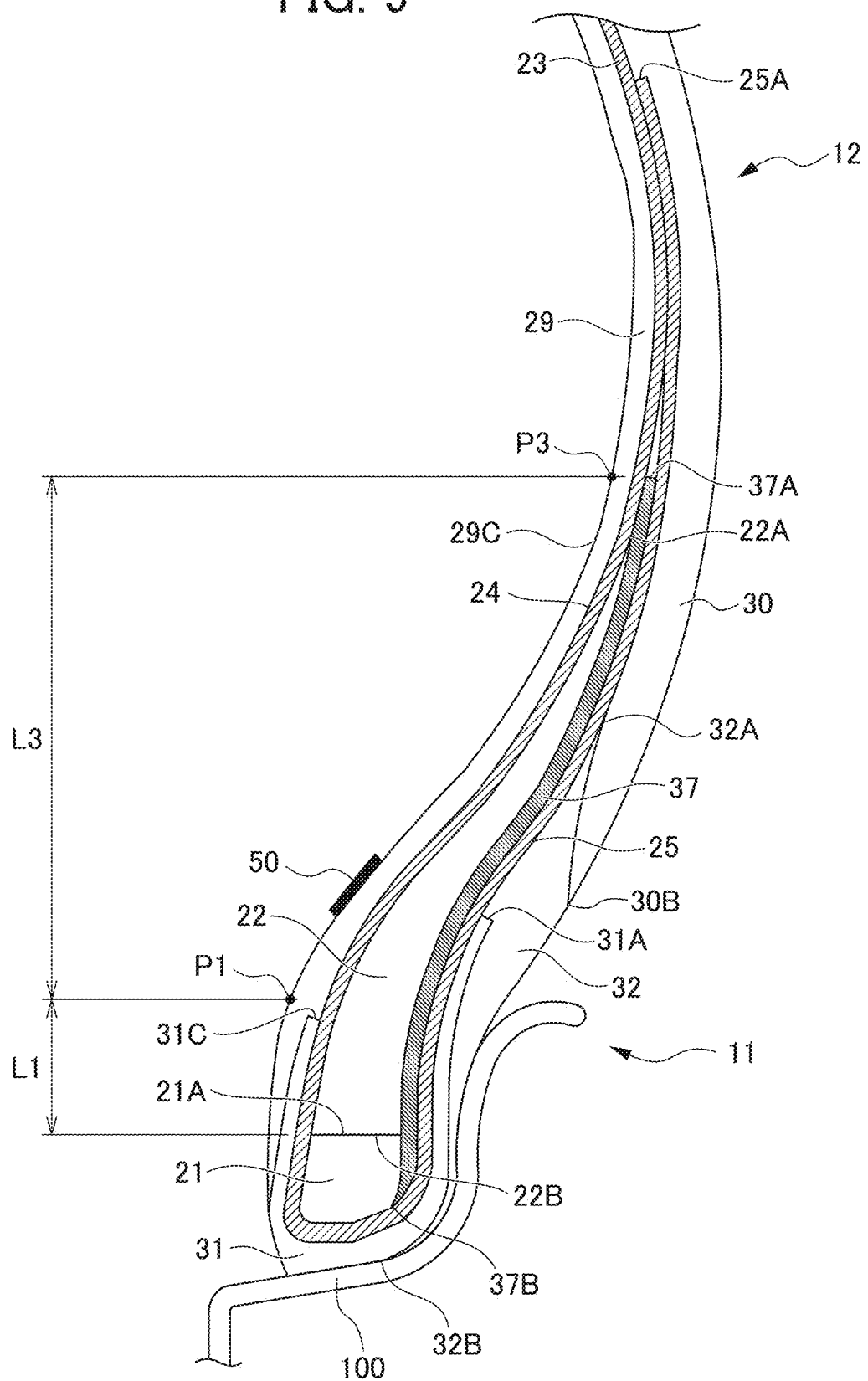
FIG. 9 is a partial enlarged cross-sectional view of the tire in FIG. 8.

It should be noted that the aforementioned contents similarly apply for FIGS. 2, 8 and 9.

The tire 1 is a tire for passenger cars, for example, and includes a pair of beads 11 provided at both sides in the tire-width direction, a sidewall 12 which extends from each of the beads 11 to the outer side in the tire-radial direction; and annular tread 13 which connects to the outer side in the tire-radial direction of each of the sidewalls 12 and extends in the circumferential direction of the tire constituting the tire tread (contact patch with road surface R) 13C.

FIG. 2 shows an enlarged cross-sectional view in the periphery in a tire-radial direction inside region of the bead 11 and sidewall 12 of the tire 1 of the present embodiment shown in FIG. 1.

The bead 11 includes a bead core 21, and bead filler 22 extending to the outer side in the tire-radial direction of the bead core 21.

The bead core 21 is an annular member formed by wrapping around several times bead wires made of metal coated with rubber, and is a member which plays a role of fixing the tire 1 filled with air to the rim 100 of a wheel.

The bead filler 22 is a rubber member of tapered tip shape, extending to the outer side in the tire-radial direction of the bead core 21. The bead filler 22 has a tire-radial direction outside end 22A and a tire-radial direction inside end 22B. The tire-radial direction inside end 22B of the bead filler 22 contacts with the tire-radial direction outside end 21A of the bead core 21. The bead filler 22 is a member provided in order to raise the rigidity of the bead peripheral part and to ensure high maneuverability and stability. The bead filler 22 is configured by rubber of higher hardness than the surrounding rubber members, for example. The modulus of rubber constituting the bead filler 22 is higher than at least the modulus of rubber constituting the inner liner 29 described later and the rubber constituting the sidewall rubber 30. Herein, the modulus indicates 100% elongation modulus (M100) under a 23° C. atmosphere, measured in accordance with "3.7 stress at a given elongation, S" of JIS K6251:2010.

A carcass ply 23 bridging between the pair of beads 11 is embedded inside of the tire 1. The carcass ply 23 configures a ply serving as the backbone of the tire 1, and is embedded within the tire 1, in a form passing through the pair of sidewalls 12 and the tread 13 between the pair of beads 11.

The carcass ply 23 includes the ply body 24 which extends from one bead 11 to the other bead 11 and exists between the tread 13 and bead 11; and the ply folding part 25 which is folded back around the bead core 21. In the present embodiment, the ply folding part 25 is overlapped with the ply body 24 in the region of the sidewall 12. A ply folding part 25 has an end 25A. In the present embodiment, the end 25A of the ply folding part 25 is positioned in a region of the sidewall 12.

The carcass ply 23 is configured by a plurality of ply cords extending in the tire-width direction. In addition, a plurality of ply cords is arranged side by side in a tire circumferential direction. This ply cord is configured by an insulated organic fiber cord such as polyester or polyamide, or the like, and is covered by topping rubber.

It should be noted that the carcass ply 23 of the present embodiment is a single-layer structure carcass ply 23 including one layer of a ply body 24. However, the carcass ply 23 may be a multi-layer structure carcass ply 23 including a plurality of layers of ply body 24.

The bead 11 further includes rim strip rubber 32.

The rim strip rubber 32 is provided so as to cover the carcass ply 23 provided around the bead core 21. In more detail, the rim strip rubber 32 is provided so as to cover the inner side in the tire-width direction, inner side in the tire-radial direction and the outer side in the tire-width direction of the carcass ply 23 in the vicinity of the bead core 21. The rim strip rubber 32 has a first end 32A arranged at an outer side in the tire-width direction of the ply folding part 25, and a second end 32C arranged on the inner side in the tire-width direction of the ply body 24. Herein, the first end 32A configures a tire-radial direction outside end 32A of the rim strip rubber 32. A part of the rim strip rubber 32 configures an outer wall surface of the tire 1. In addition, the rim strip rubber 32, upon the tire 1 being mounted to a wheel, is a rubber member in which the outer side in the tire-width direction and the inner side in the tire-radial direction thereof contact with the rim 100 of the wheel. The modulus of rubber constituting the rim strip rubber 32 is higher than at least the modulus of rubber constituting the inner liner 29 described later, and the rubber constituting the side-wall rubber 30.

The side-wall 12 includes the side-wall rubber 30 arranged on the outer side in the width direction of the carcass ply 23.

The side-wall rubber 30 is a rubber member configuring the outer wall surface of the tire 1. The side-wall rubber 30 has a tire-radial direction outside end 30A and tire-radial direction inside end 30B. This side-wall rubber 30 is a portion which bends the most upon the tire 1 exhibiting a cushioning action, and usually flexible rubber having fatigue resistance is adopted therein.

The tread 13 includes a steel belt 26 as a belt arranged on the outer side in the tire-radial direction of the carcass ply 23, a cap ply 27 arranged on the outer side in the tire-radial direction of the steel belt 26, and tread rubber 28 arranged on the outer side in the tire-radial direction of the cap ply 27.

The steel belt 26 is configured by a plurality of steel cords covered by rubber. By providing the steel belts 26, the rigidity of the tire 1 is ensured, and the contact state of the road surface with the tread 13 improves. The steel belt 26 of the present embodiment is configured by a two-layer structure from a steel belt 261 on an inner side and a steel belt 262 on an outer side. However, the steel belt 26 may be a single-layer structure, or may be a structure of three or more layers. It should be noted that a belt made using a tire cord or the like made using aramid fiber may be used in place of the steel belt 26 made using steel belts. It should be noted that, in the two-layer structure steel belt 26 of the present embodiment, the steel belt 261 on the inner side is wider than the steel belt 262 on the outer side. Therefore, the tire-width direction outside end of the steel belt 261 on the inner side includes the tire-width direction outside end 26A of the steel belt 26.

The cap ply 27 is a member arranged on the outer side in the tire-radial direction of the steel belt 26, and has a function as a belt reinforcement layer. The cap ply 27 is configured by an insulative organic fiber layer such as polyamide fiber, and is covered by topping rubber. By providing the cap ply 27, it is possible to achieve an improvement in durability and reduction in load noise while traveling. The cap ply 27 of the present embodiment is configured by a two-layer structure from a cap ply 271 on the outer side and a cap ply 272 on the inner side. The cap ply 272 on the inner side exists only in a tire-width direction outside region, and a central part in the tire-width direction is outlined. However, the cap ply 272 on the inner side may be a cap ply of the same structure as the cap ply 271 on the outer side not having an outlined part. In addition, the cap ply 27 may be a single-layer structure, or may be a structure of three or more layers. In the present embodiment, the tire-width direction outside end 27A of the cap ply 27 extends more to the outer side in the tire-width direction than the tire-width direction outside end 26A of the steel belt 26.

The tread rubber 28 is a member constituting tire tread (contact patch with road surface R) 13C. The tread rubber 28 has a tire-width direction outside end 28A. A tread pattern (not shown) constituted by a plurality of grooves is provided to the tire tread 13C of the tread rubber 28.

In the bead 11, sidewall 12 and tread 13, an inner liner 29 as a rubber layer constituting an inner wall surface of the tire 1 is provided to the tire inner cavity side of the carcass ply 23. The inner liner 29 is configured by air permeation resistant rubber, whereby the air inside the tire inner cavity is prevented from leaking to outside.

Herein, as shown in FIG. 1, the sidewall rubber 30 of the sidewall 12 extends towards the tread 13. On the other hand, the tread rubber 28 of the tread 13 extends towards the sidewall 12. As a result thereof, the tread rubber 28 and sidewall rubber 30 enter a layered state, on the tire outer surface side of a partial region of the carcass ply 23. In more detail, in a region in which the sidewall rubber 30 and tread rubber 28 both exist, i.e. movement region of the sidewall 12 and tread 13, the sidewall rubber 30 and tread rubber 28 are in a layered state in order, on the tire outer surface side of the carcass ply 23.

As shown in FIGS. 1 and 2, on the outer side in the tire-width direction of the bead 11 and carcass ply 23 of the sidewall 12, the rim strip rubber 32 and sidewall rubber 30 arranged on the outer side in the tire-radial direction of the rim strip rubber 32 are arranged. The surface on the outer side in the tire-width direction of the rim strip rubber 32 and the surface on the outer side in the tire-width direction of the side-wall rubber 30 form the outer surface of the tire 1.

In the present embodiment, the tire-radial direction outside end 32A of the rim strip rubber 32 is arranged more to the outer side in the tire-radial direction than the tire-radial direction outside end 22A of the bead filler 22. It is thereby possible to more effectively suppress local deformation from occurring in the vicinity of the rim mounting part.

As shown in FIGS. 1 and 2, in the vicinity of the movement region of the bead 11 and sidewall 12, the rim strip rubber 32 and sidewall rubber 30 enter a layered state in order on the tire outer surface side of the carcass ply 23. In addition, a rim protector 33 which has an apex part 33A projecting to the outer side in the tire-width direction and continuously extending in a ring shape in the tire circumferential direction is provided in this transition region vicinity. In the present embodiment, the apex part 33A of the rim protector 33 is provided at a boundary portion between the rim strip rubber 32 and side-wall rubber 30. In other words, the position of the apex part 33A of the rim protector 33 matches the position of the tire-radial direction inside end 30B of the side-wall rubber 30. The rim protector 33 has a function of protecting the rim from external damage.

The tire 1 of the present embodiment has an electronic component unit 50. The electronic component unit 50 is pasted to the tire inner cavity side 29C of the inner liner 29. The electronic component unit 50 of the present embodiment is an RFID tag unit, for example.

Figure 3A:
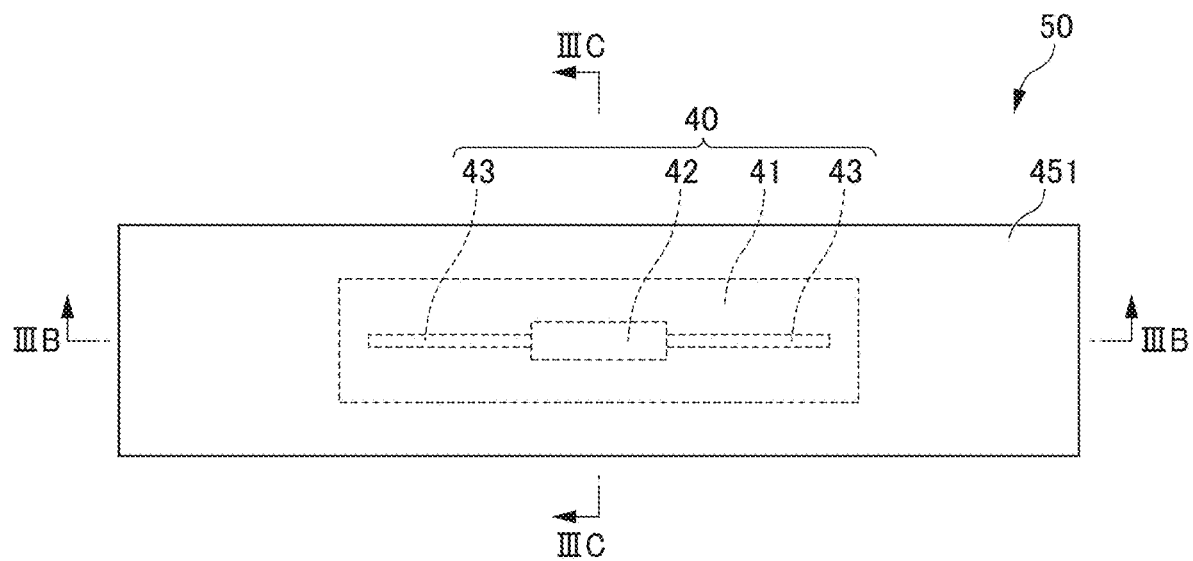
FIG. 3A is a view for explaining an electronic component unit of the present embodiment.
Figure 3B:
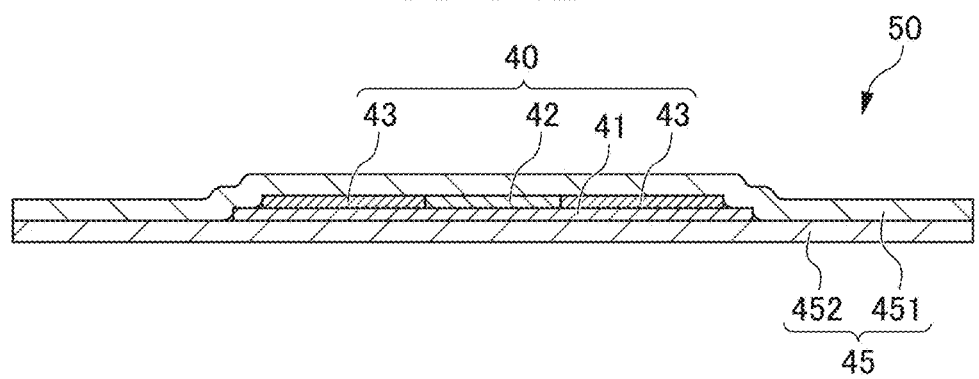
FIG. 3B is a cross-sectional view showing a cross section along the line IIIB-IIIB in FIG. 3A.
Figure 3C:
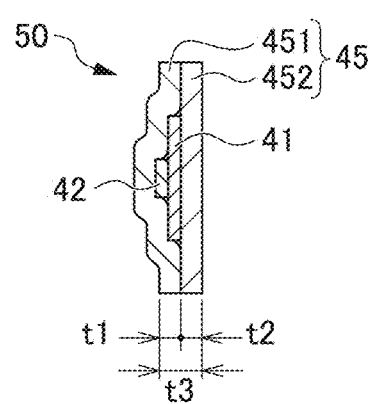
FIG. 3C is a cross-sectional view showing a cross section along the line IIIC-IIIC in FIG. 3A.

FIGS. 3A to 3C are views for explaining the electronic component unit 50. FIG. 3A is a view looking at the electronic component unit 50 from one side. FIG. 3B is a cross-sectional view showing a cross section along the line IIIB-IIIB in FIG. 3A. FIG. 3C is a cross-sectional view showing a cross section along the line IIIC-IIIC in FIG. 3A.

The electronic component unit 50 includes an electronic component 40, and a flexible film 45 (a resin film 45) which covers at least part of the electronic component 40. It should be noted that, in FIG. 3A, the electronic component 40 is shown by a hidden line due to being covered by a first flexible film 451 constituting the flexible film 45.

The electronic component 40 includes a flexible substrate 41, IC chip 42 and antenna 43. The electronic component 40 of the present embodiment is an RFID tag, for example.

The flexible substrate 41 is a film-like substrate having pliability. As the material of the flexible substrate 41, a polyimide resin can be used, for example.

The IC chip 42 of the present embodiment is an RFID chip. The IC chip 42 is mounted to the flexible substrate 41. The IC chip 42 includes a communication circuit and a storage unit. In a storage part inside the IC chip 42, identification information such as a manufacturing number and part number is stored.

The antenna 43 is a printed antenna configured from conductive material printed in a predetermined pattern on the flexible substrate 41. This predetermined pattern, for example, may be linear, wavelike or spiral. The antenna 43 is established at an antenna length optimized according to the frequency band, etc. to be used. The antenna 43 is electrically connected with the IC chip 42. The material constituting the antenna 43 may be a conductive material such as copper, for example. By using such a printed antenna as the antenna 43, it is possible to thin the thickness of the electronic component 40 and electronic component unit 50.

It should be noted that the antenna 43 is not limited to a printed antenna, and may be various antennas such as a coil spring antenna, plate antenna or rod antenna. In this case, the electronic component 40 does not necessarily have a flexible substrate 41, i.e. the electronic component 40 may be configured by the IC chip 42 and antenna 43.

In this way, the electronic component 40 of the present embodiment at least includes the IC chip 42 and the antenna 43. The electronic component 40 thereby performs wireless communication with a reader that is not illustrated serving as external equipment. The electronic component 40 of the present embodiment may be a passive-type transponder.

The flexible film 45 of the present embodiment has a first flexible film 451 and a second flexible film 452. The first flexible film 451 covers one side (top surface) of the electronic component 40. The second flexible film 452 covers the other side (back surface) of the electronic component 40. In other words, the electronic component 40 is interposed by the first flexible film 451 and second flexible film 452 constituting the flexible film 45. It should be noted that the one side (top surface) of the electronic component 40 is a surface of the flexible substrate 41, and is a mounting face to which the IC chip is mounted. The antenna 43 is also printed on the surface of the flexible substrate 41. On the other hand, the other side (back surface) of the electronic component 40 is the back surface of the flexible substrate 41, and is a non-mounting face for the IC chip 42.

It should be noted that the electronic component 40 is preferably entirely covered by the flexible film 45 configured by the first flexible film 451 and second flexible film 452, as shown in the present embodiment. However, the electronic component 40 may have at least part thereof covered by the flexible film 45. For example, constituting the flexible film 45 by only the first flexible film 451, a situation may be established in which one side (top surface) of the electronic component 40, i.e. mounting face of the flexible substrate 41, is covered by the first flexible film 451. The electronic component 40 is also thereby protected.

The first flexible film 451 and second flexible film 452 configuring the flexible film 45 are resin films. The first flexible film 451 and second flexible film 452 (The first resin film 451 and second resin film 452) are preferably polyimide films, for example. Polyimide film is superior in heat resistance and has moderate flexibility and a spring characteristic; therefore, it is suitable as a member protecting the electronic component 40.

The thickness t1 of the first flexible film 451 and the thickness t2 of the second flexible film 452 are preferably at least 50 μm and no more than 750 μm, respectively. The thickness t3 of the entire flexible film 45, i.e. thickness t3 of portion overlapping the first flexible film 451 and second flexible film 452, is preferably at least 100 μm and no more than 1500 μm. It is thereby possible to suitably protect the electronic component 40, while imparting moderate flexibility to follow the changes in shape of the tire inner cavity side 29C of the inner liner 29. It should be noted that, in the case of configuring the flexible film 45 from only one flexible film, e.g., the first flexible film 451, the thickness of the flexible film 45 may be at least 50 μm and no more than 750 μm. The overall thickness of the flexible film 45 may be at least 50 μm and no more than 1500 μm.

Figure 4A:
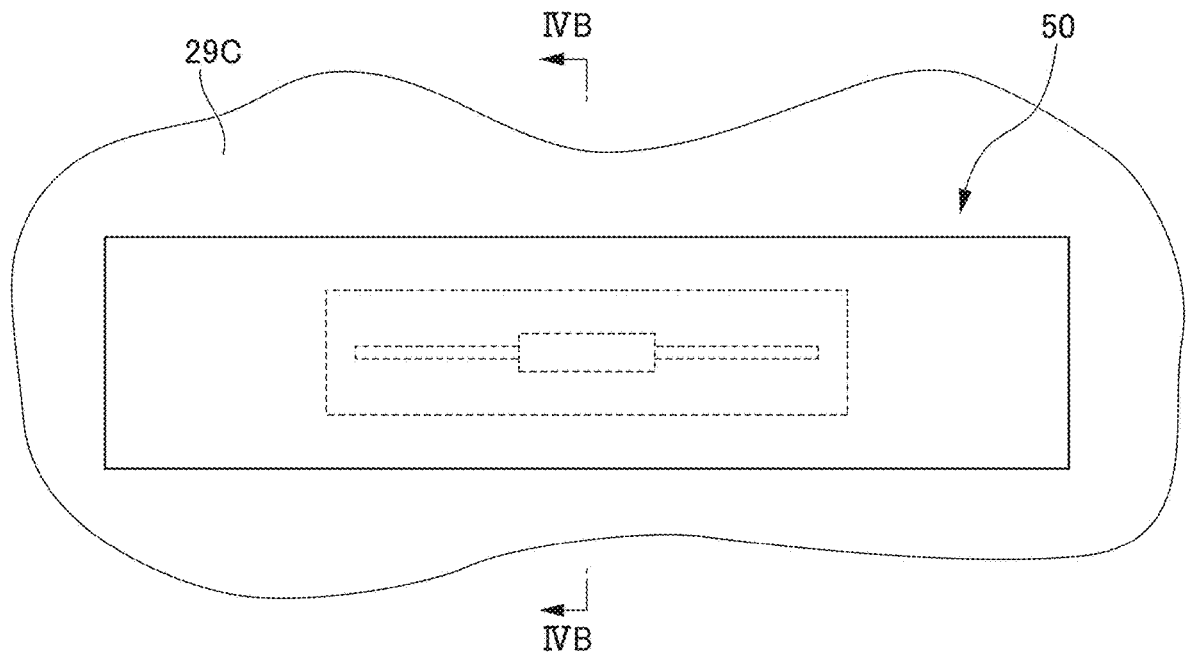
FIG. 4A is a view showing an electronic component unit pasted to an inner liner.
Figure 4B:
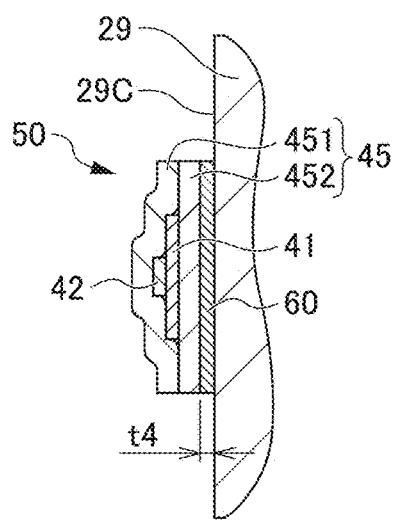
FIG. 4B is a cross-sectional view showing a cross section along the line IVB-IVB in FIG. 4A.

FIGS. 4A and 4B are views showing the electronic component unit 50 pasted to the tire inner cavity side 29C of the inner liner 29. FIG. 4A is a view when looking at the electronic component unit 50 pasted to the tire inner cavity side 29C of the inner liner 29 from the tire inner cavity towards the tire outer surface side. FIG. 4B is a cross-sectional view showing a cross section along the line IVB-IVB in FIG. 4A.

As shown in FIG. 4B, the electronic component unit 50 is pasted via a vulcanizing adhesive 60 on the tire inner cavity side 29C of the inner liner 29. As shown in FIG. 4B, the flexible film 45 is configured by the first flexible film 451 and second flexible film 452, and the vulcanizing adhesive 60, second flexible film 452, electronic component 40 and first flexible film 451 are arranged in order on the tire inner cavity side 29C of the inner liner 29.

The vulcanizing adhesive 60 may be made by blending a vulcanization accelerator and acid acceptor into a rubber component. For example, the vulcanizing adhesive 60 may be made by dispersing a polymeric material, organic material and filler as a composition into an organic solvent system such as xylene. As the polymeric material and organic material, halogen-based polymers, etc. can be used. As the filler, carbon black, silica, etc. can be used.

The thickness of the vulcanizing adhesive 60 joining the inner liner 29 and electronic component unit 50 is preferably no more than 30 μm. If the thickness of the vulcanizing adhesive 60 exceeds 30 μm, the flexibility of the vulcanizing adhesive 60 after vulcanization declines, and will hardly follow changes in shape of the tire inner cavity side 29C of the inner liner 29. By establishing the thickness of the vulcanizing adhesive 60 as no more than 30 μm, moderate flexibility of the vulcanizing adhesive 60 is ensured, and will tend to follow changes in shape of the tire inner cavity side 29C of the inner liner 29. Even if the tire 1 deforms during tire use, it is thereby possible to suppress the occurrence of flaws such that the electronic component unit 50 detaching from the inner liner 29. The thickness of the vulcanizing adhesive 60 is more preferably at least 10 μm and no more than 30 μm. By establishing the thickness as at least 10 μm, the adhesive strength rises, and it is possible to suppress the occurrence of a situation such that the end, etc. of the electronic component unit 50 are partially peeled off.

It should be noted that the thickness of the vulcanizing adhesive 60 is preferably thinner than the thickness of the flexible film 45. It is thereby possible to suppress the occurrence of flaws such as the electronic component unit 50 detaching from the inner liner 29, caused by the lowness of flexibility of the vulcanizing adhesive 60 itself.

Herein, the hardness after vulcanization of the vulcanizing adhesive 60 is preferably at least the hardness of the inner liner 29, and no more than the hardness of the flexible film 45. The gradient in hardness thereby becomes gentle, and a shock absorbing effect can be obtained. Therefore, even if the tire 1 repeatedly deforms, the stress acting on the electronic component 40 is suppressed, and it is possible to improve the durability of the electronic component 40.

In this way, by interposing the electronic component 40 with the two flexible films 451, 452, the thickness thins, and it is possible to form an electronic component unit 50 for which pasting work is easily done thereafter.

It should be noted that the electronic component unit 50 is arranged in an orientation such that the longitudinal direction of the electronic component unit 50, i.e. longitudinal direction of the antenna 43, faces a direction corresponding to the circumferential direction of the tire 1. In other words, it is provided in the tire 1 so that the longitudinal direction of the antenna 43 becomes the circumferential direction of the tire 1 or the direction of the tangential line relative to the circumferential direction of the tire 1, i.e. direction orthogonal to the paper plane of the cross-sectional views of FIGS. 1 and 2. By arranging the electronic component unit 50 so as to be such a direction, even if the tire 1 deforms during tire use, stress hardly acts on the electronic component 40.

The electronic component unit 50 has at least a part thereof arranged at a position in the tire-radial direction distanced at least 5.0 mm to the outer side in the tire-radial direction from the tire-radial direction outside end 21A of the bead core 21. When explained using FIGS. 1 and 2, the electronic component unit 50 of the present embodiment is arranged more to the outer side in the tire-radial direction than the tire-radial direction position P1 distanced by a predetermined distance L1 to the outer side in the tire-radial direction from the tire-radial direction outside end 21A of the bead core 21, on the tire inner cavity side 29C of the inner liner 29. Herein, the predetermined distance L1 is 5.0 mm. It should be noted that an entire portion of the electronic component 40 is preferably arranged at a tire-radial direction position distanced at least 5.0 mm to the outer side in the tire-radial direction from the tire-radial direction outside end 21A of the bead core 21.

FIG. 5 shows the result of examining the relationship of the communication distance relative to the separation distance of the RFID tag as the electronic component 40 from the tire-radial direction outside end 21A of the bead core 21. It should be noted that the communication distance on the vertical axis is a value indexing the communication distance with the longest communication distance as 100. It is preferable if this value is at least 40, and more preferably at least 60.

There is a bead core 21. From FIG. 5, it is found that a preferred communication distance is obtained when arranging the electronic component 40 to be separated by at least 5.0 mm from the tire-radial direction outside end 21A of the bead core 21. It should be noted that, from FIG. 5, it is also found that a preferable communication distance is obtained when arranging the electronic component 40 to be separated by at least 10 mm from the tire-radial direction outside end 21A of the bead core 21.

In the above way, the electronic component unit 50 is preferably arranged at a tire-radial direction position separated by at least 5.0 mm to the outer side in the tire-radial direction from the tire-radial direction outside end 21A of the bead core 21, in the tire inner cavity side 29C of the inner liner 29. It is thereby possible to suppress a decline in communication performance from adverse effects of a bead core made of metal.

Furthermore, the electronic component unit 50 is preferably arranged more to the outer side in the tire-radial direction than the tire-radial direction position P1 distanced by 5.0 mm to the outer side in the tire-radial direction from the tire-radial direction outside end 21A of the bead core 21, and more to the inner side in the tire-radial direction than a position P2 on the tire inner cavity side of the inner liner 29 constituting the bead thickest part T. For example, at least part of the electronic component unit 50 is arranged more to the inner side in the tire-radial direction than the position P2 on the tire inner cavity side of the inner liner 29 constituting the bead thickest part T. In other words, at least part of the electronic component unit 50 is arranged within a region of range L2 shown in FIGS. 1 and 2. More preferably, the entire portion of the electronic component 40 is arranged within the domain of range L2. Herein, bead thickest part T is a portion in which a distance (thickness) from the tire inner cavity side 29C of the inner liner 29 until the tire outer surface becomes the longest, when drawing a normal vector from the tire inner cavity side 29C of the inner liner 29, in a tire-width direction cross-sectional view shown in FIGS. 1 and 2. In the present embodiment, a thick portion passing through the apex part 33A (tire-radial direction inside end 30B of the side-wall rubber 30) of the rim protector 33 is the bead thickest part T. It should be noted that the cross-sectional view of FIG. 1 is a tire-width direction cross-sectional view (tire meridian axis cross-sectional view) in an unloaded state mounting the tire to a standard rim, and filling the standard internal pressure.

Figure 6:
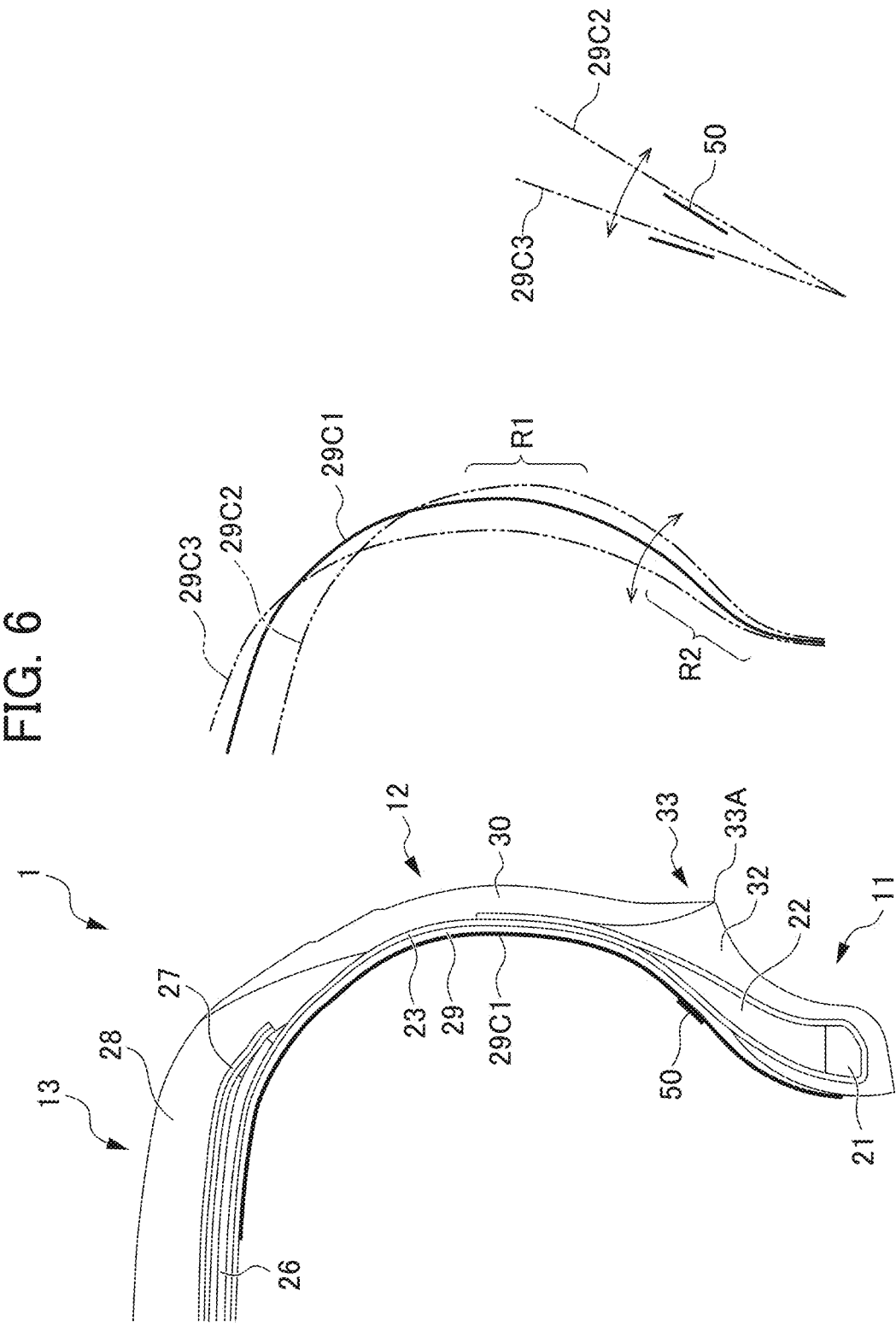
FIG. 6 is a view for explaining motion of a tire inner cavity side of the inner liner in the case of the tire deforming.

FIG. 6 is a view for explaining the motion of the tire inner cavity side 29C of the inner liner 29, in the case of the tire 1 deforming. Similarly to FIG. 1, the left-side view of FIG. 6 is a tire-width direction cross-sectional view of an unloaded state mounting the tire 1 to a standard rim, and filling the standard internal pressure. The bold line 29C1 in this figure is a line indicating the tire inner cavity side 29C of the inner liner 29 in the aforementioned unloaded state.

The center view in FIG. 6 is a view for explaining the change in shape of the tire inner cavity side 29C of the inner liner 29, in the case of the tire 1 deforming. The line indicating the tire inner cavity side 29C in the aforementioned unloaded state is shown by the bold line 29C1 in this figure. Then, the line indicating the tire inner cavity side 29C when the tire 1 widens in the tire-width direction and makes a flat shape, by a strong force acting from the road surface on the tread 13, etc. is shown by the two-dot chain line 29C2. Furthermore, the line indicating the tire inner cavity side 29C after a strong force acts on the tread 13 from the road surface, when the tire 1 is released from this force, and becomes a shape such that stretches in the tire-radial direction by recoil thereof is shown by the two-dot chain line 29C3.

As shown in this figure, in a neighboring region R1 of the tire widest part of the sidewall 12, the curve of the tire inner cavity side 29C of the inner liner 29 greatly changes to follow the deformation of the tire 1. Therefore, in the case of pasting the electronic component unit 50 to this region R1, force such that compresses and force such that pulls the electronic component unit 50 tends to occur accompanying deformation of the tire 1. In other words, force such that peels the electronic component unit 50 from the inner liner 29 tends to occur.

On the other hand, the region R2 in FIG. 6, which is a region corresponding to the range L2 shown in FIGS. 1 and 2, is a region in which the electronic component unit is arranged in the present embodiment. In this region R2, the curve of the tire inner cavity side 29C of the inner liner 29 hardly changes relatively, even when the tire 1 deforms. In other words, as shown on the right-side view in FIG. 6, the motion of the tire inner cavity side 29C of the inner liner 29 becomes mainly motion such that collapses inwards. Therefore, in the case of pasting the electronic component unit 50 to this region R2, force such that compresses and force such that pulls the electronic component unit 50 hardly occurs even when the tire 1 deforms. In other words, force such that the electronic component unit 50 detaches from the tire inner cavity side 29C of the inner liner 29 hardly occurs.

Furthermore, as mentioned above, the electronic component unit 50 is arranged in an orientation such that the longitudinal direction of the antenna 43 faces a direction corresponding to the circumferential direction of the tire 1. Consequently, force such that the electronic component unit 50 detaches from the tire inner cavity side 29C of the inner liner 29 hardly occurs.

It should be noted that, in the present embodiment, the electronic component unit 50 is arranged more to an inner side in the tire-radial direction than the tire-radial direction position of the tire-radial direction outside end 32A of the rim strip rubber 32. By at least part of the electronic component unit 50 being arranged more to the inner side in the tire-radial direction than the tire-radial direction position of the tire-radial direction outside end 32A of the rim strip rubber 32, since the electronic component unit 50 comes to be arranged at the inner side in the tire-width direction of the rim strip rubber 32 configured by rubber of high modulus or the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs. It should be noted that the entire portion of the electronic component 40 is preferably arranged more to the inner side in the tire-radial direction than the tire-radial direction position of the tire-radial direction outside end 32A of the rim strip rubber 32.

It should be noted that, in the present embodiment, the electronic component unit 50 is arranged more to the inner side in the tire-radial direction than the tire-radial direction position of the tire-radial direction outside end 22A of the bead filler 22. By at least part of the electronic component unit 50 being arranged more to the inner side in the tire-radial direction than the tire-radial direction position of the tire-radial direction outside end 22A of the bead filler 22, since the electronic component unit 50 comes to be arranged at the inner side in the tire-width direction of the bead filler 22 configured by rubber of high modulus or in the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs. It should be noted that the entire portion of the electronic component 40 is preferably arranged more to the inner side in the tire-radial direction than the tire-radial direction position of the tire-radial direction outside end 22A of the bead filler 22.

Figure 7:
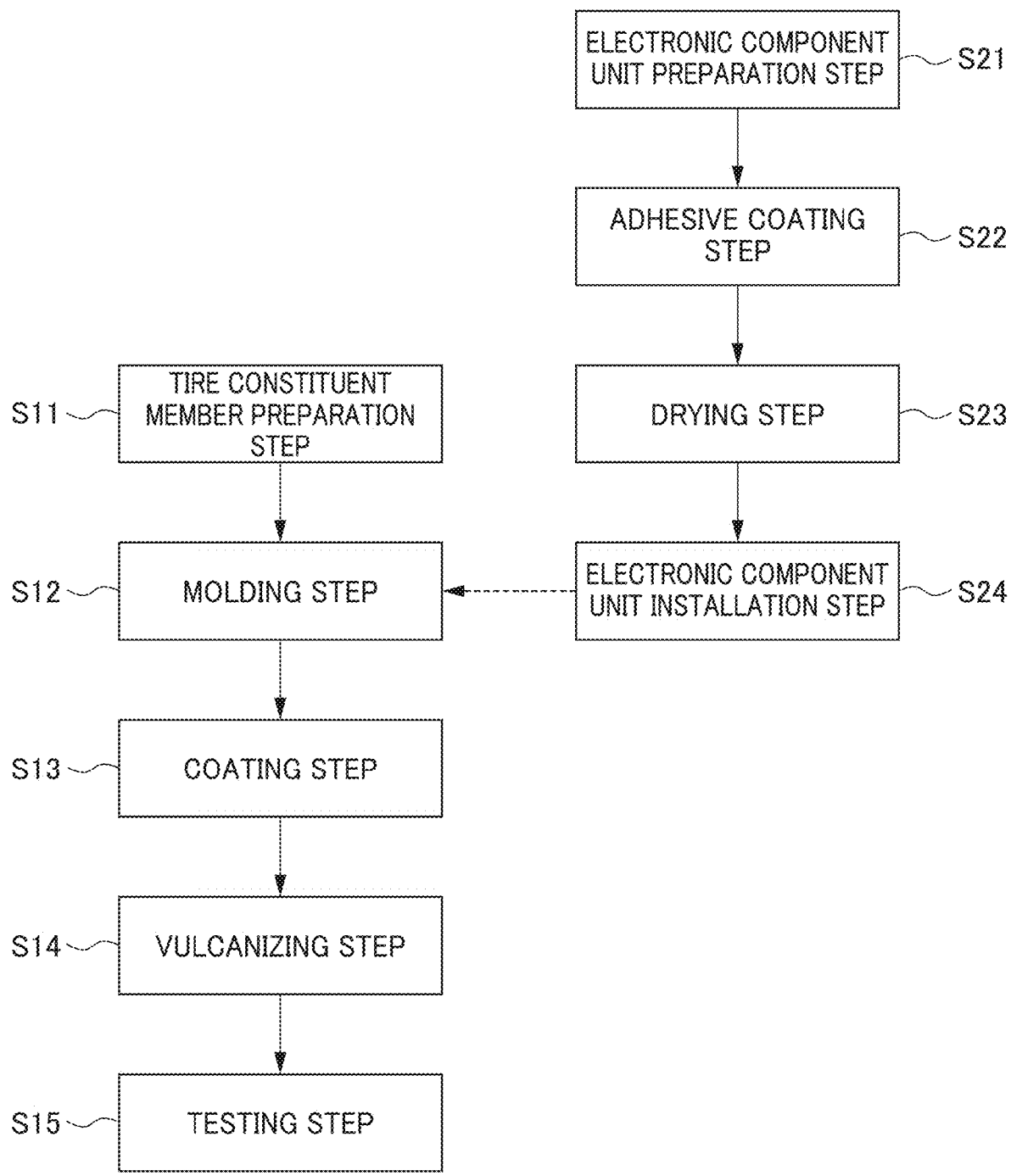
FIG. 7 is a flowchart for explaining a manufacturing method of the tire according to the present embodiment.

Next, a manufacturing method for the tire 1 of the present embodiment will be explained. FIG. 7 is a flowchart for explaining the manufacturing method for the tire 1 of the present embodiment. The manufacturing method for the tire 1 of the present embodiment includes: a tire constituent member preparation step S11 of preparing tire constituent members; a molding step S12 of assembling the tire constituent members and molding a green tire; a coating step S13 of performing coating on the molded green tire; a vulcanization step S14 of vulcanizing the green tire which was coated after molding; and a testing step S15 of testing the vulcanized tire.

In addition, upon establishing a state in which the electronic component unit 50 is installed to the green tire molded in the molding step S12, the manufacturing method of the tire 1 of the present embodiment further includes: an electronic component unit preparation step S21 of preparing the electronic component unit 50; an adhesive coating step S22 of coating the vulcanizing adhesive onto the electronic component unit 50; a drying step S23 of drying the electronic component unit 50 on which the adhesive was coated, and preparing a dried electronic component unit 50 which has been dried for at least a predetermined time; and an electronic component unit installation step S24 of installing the dried electronic component unit 50 onto the rubber members serving as the tire constituent members.

First, the flow of the tire constituent member preparation step S11 to the testing step S15 will be explained.

In the tire constituent member preparation step S11, the tire constituent members including the rubber members constituting the tire 1 are prepared. At this time, the rubber members such as the bead filler 22, tread rubber 28, inner liner 29, side-wall rubber 30 and rim strip rubber 32 are in the state of raw rubber prior to vulcanization.

In the molding step S12, the tire constituent members including the rubber members constituting the tire 1 are assembled, and the green tire is molded.

In the coating step S13, a mold release agent is coated onto the inner surface of the green tire molded by the molding step S12. In the subsequent vulcanization step S14, the bladder and tire are thereby preventing from sticking together.

In the vulcanization step S14, after molding by the molding step S12, the green tire coated by the coating step S13 is vulcanized by a vulcanization device. The green tire is vulcanized by heat and pressure being applied inside of the vulcanization device. It should be noted that, during vulcanization, the bladder which is a bag-like pressing member is arranged at an inside space (inner cavity) of the green tire. The bladder inflates within the inside space of the green tire, by high-temperature, high-pressure pressurizing medium being supplied inside.

In the testing step S15, the tire vulcanized by the vulcanization step S14 is tested. As the test criteria, for example, test criteria such as uniformity, dynamic balance and visual inspection can be exemplified.

Next, the electronic component unit preparation step S21 to electronic component unit installation step S24, which are steps for installing the electronic component unit 50 in the green tire, will be explained.

In the electronic component unit preparation step S21, the electronic component unit 50 is prepared. In the present embodiment, the electronic component unit 50 having the electronic component 40 and flexible film 45 covering at least part of the electronic component 40 is prepared.

In an adhesive coating step S22, a vulcanizing adhesive 60 prior to curing is coated onto the electronic component unit 50. For example, the vulcanizing adhesive 60 is coated onto the second flexible film 452 (refer to FIG. 4B) covering the back surface (back surface of flexible substrate 41) of the electronic component 40. The vulcanizing adhesive 60 is coated by brushing, dipping or the like. For example, by defining the number of times of dipping, it is possible to control the coating film thickness. The vulcanizing adhesive 60 is preferably coated so as to have a thickness after vulcanization of at least 10 µm and no more than 30 µm.

In the drying step S23, the electronic component unit 50 on which the vulcanizing adhesive 60 prior to curing was coated is dried. The vulcanizing adhesive 60 coated on the electronic component unit 50 dries in a state of a coated thin film. By this drying step S23, the dried electronic component unit 50 which was dried for at least a predetermined time is prepared. This predetermined time is 1 hour, for example, in the case of the thickness of the vulcanizing adhesive 60 being no more than 30 µm. In other words, in the present embodiment, in the drying step S23, the electronic component unit 50 which has been dried for at least 1 hour becomes the dried electronic component unit 50.

In the electronic component unit installation step S24, the dried electronic component unit 50 is installed to the rubber members prior to vulcanization. This electronic component unit installation step S24 is conducted in the middle or before and after the molding step S12. For example, the electronic component unit 50 may be installed to the rubber members prior to being assembled, or may be installed to the rubber members during assembly at an intermediate stage which is a green tire. In addition, the electronic component unit 50 may be installed to the rubber members after being assembled into a green tire. It thereby enters a state in which the electronic component unit 50 is installed to the green tire assembled by the molding step S12.

In the vulcanization step S14 after the aforementioned coating step S13, the green tire including the rubber members to which the dried electronic component unit 50 was installed is vulcanized. The electronic component unit 50 and rubber members are thereby joined.

It should be noted that the vulcanizing adhesive 60 dried by the drying step S23 tends to temporarily adhere to the rubber members prior to vulcanization. Consequently, it is possible to improve the workability of the work for pasting the electronic component unit 50. In addition, the dried vulcanizing adhesive 60 integrates with the rubber members in the subsequent vulcanization step S14. In other words, in the vulcanization step S14, by heat and pressure being applied, the rubber member and vulcanizing adhesive 60 are vulcanized and joined together. Consequently, it is possible to raise the joining strength between the electronic component unit 50 and rubber members.

It should be noted that, in the drying step S23, the electronic component unit 50 on which the vulcanizing adhesive 60 was coated may be dried under a room-temperature environment. However, the electronic component unit 50 on which the vulcanizing adhesive 60 was coated is preferably dried in an atmosphere of at least 60° C. and no higher than 80° C. It should be noted that, if dried in an atmosphere exceeding 90° C., it is not preferable since the vulcanization promoter blended into the vulcanizing adhesive 60 starts reaction.

It should be noted that, in the drying step S23, it is preferable to dry a plurality of the electronic component units 50. Then, in the electronic component unit installation step S24, it is preferable to pick up from among the plurality of electronic component units 50 the dried electronic component unit 50 which was dried for at least a predetermined time and install to the rubber members. Even in a case of providing the drying step S23, it is thereby possible to suppress a decline in yield cycle time.

It should be noted that, in the electronic component unit installation step S24, it is preferable for the dried electronic component unit 50 to be distinguished from the electronic component units 50 for which the drying time has not elapsed the predetermined time, and to be picked out.

For example, in the drying step S23, the plurality of electronic component units 50 in a state with the vulcanizing adhesive 60 coated is arranged within a predetermined area. The predetermined area may be a workbench, or may be a thermostatic oven for performing temperature management. Then, by attaching a marker such as a making time of the electronic component unit 50 made in the drying step S23 near the electronic component unit 50, a dried electronic component unit 50 and an electronic component unit 50 for which the drying time has not elapsed the predetermined time may be distinguished.

It should be noted that, in the present embodiment, in the electronic component unit installation step S24, the dried electronic component unit 50 is pasted to the tire inner cavity side 29C of the inner liner 29 prior to vulcanization.

It should be noted that, as shown in the present embodiment, after finishing the electronic component unit installation step S24, in the case of performing the vulcanization step S14 after performing the coating step S13, a situation is established in which a mold release agent does not exist between the inner cavity surface 29C of the inner liner 29 and the electronic component unit 50, and mold release agent exists between the bladder and the electronic component unit 50. Consequently, the occurrence of a vulcanization defect such that the bladder and electronic component unit 50 stick together is suppressed. Furthermore, the occurrence of an adhesion defect such that the electronic component unit 50 detaches from the inner liner 29 is suppressed.

It should be noted that, in the present embodiment, the RFID tag unit is provided to the tire 1 as the electronic component unit 50; however, the electronic component unit 50 provided to the tire is not limited to an RFID tag unit. For example, it may be an electronic component unit having various electronic components such as a sensor that performs wireless communication. It is not preferable for the electronic component unit 50 to detach from the tire 1. In addition, if the electronic component 40 is near a conductive member, there is a possibility of a performance change in the electronic component 40 arising, and becoming difficult to maintain the characteristics of the electronic component 40. In addition, there is a possibility of the electronic component 40 being damaged by excessive stress acting thereon. Consequently, even in a case of providing various electronic components 40 to the tire, it is possible to obtain the effects of the present invention. For example, the electronic component 40 may be a piezoelectric element or strain sensor.

It should be noted that the configuration and manufacturing method of the present embodiment are compatible with various types of tires. For example, it is also applicable to a tire including a flipper as a reinforced fiber layer provided so as to envelop the bead core 21. The flipper is a member which raises the rigidity of the bead 11, and the pressure bonding property between the bead 11 and rim improves by providing the flipper. The flipper is arranged so as to be sandwiched between the bead core 21 and carcass ply 23 provided around the bead core 21. The flipper is arranged so as to cover at least part on the inner side in the tire-width direction of the bead filler 22 and at least part on the outer side in the tire-width direction of the bead filler 22. The flipper is configured by an organic fiber coated layer including insulative organic fibers of polyester, polyamide or the like.

According to the tire 1 of the present embodiment, the following effects are exerted.

(1) The tire 1 according to the present embodiment includes the inner liner 29, the electronic component unit 50 pasted to the tire inner cavity side 29C of the inner liner 29, and the vulcanizing adhesive 60 which joins the inner liner 29 and the electronic component unit 50, in which the electronic component unit 50 has the electronic component 40 and the flexible film 45 (the resin film 45) which covers at least part of the electronic component 40, and the vulcanizing adhesive 60 has a thickness of no more than 30 μm. By setting the thickness of the vulcanizing adhesive 60 as no more than 30 μm in this way, moderate flexibility of the vulcanizing adhesive 60 is ensured, and will tend to follow changes in shape of the tire inner cavity side 29C of the inner liner 29. Even if the tire 1 deforms during tire use, it is thereby possible to suppress the occurrence of flaws such that the electronic component unit 50 detaching from the inner liner 29.

(2) The hardness of the vulcanizing adhesive 60 of the tire 1 according to the present embodiment is at least the hardness of the inner liner 29 and no more than the hardness of the flexible film 45 (the resin film 45). The gradient in hardness thereby becomes gentle, and a shock absorbing effect can be obtained. Therefore, even if the tire 1 repeatedly deforms, the stress acting on the electronic component 40 is suppressed, and it is possible to improve the durability of the electronic component 40.

In addition, according to the tire 1 of the present embodiment, the following effects are exerted.

(1) The tire 1 according to the present embodiment includes the pair of beads 11 having the bead core 21 and the bead filler 22 extending to the outer side in the tire-radial direction of the bead core 21; the carcass ply 23 extending from one bead 11 to the other bead 11; the inner liner 29 arranged at the tire inner cavity side of the carcass ply 23; and the electronic component unit 50 pasted to the tire inner cavity side 29C of the inner liner 29, in which the electronic component unit 50 is arranged at a tire-radial direction position distanced at least 5.0 mm to the outer side in the tire-radial direction from the tire-radial direction outside end 21A of the bead core 21. It is thereby possible to suppress the occurrence of flaws in the electronic component unit 50 such as a decline in communication performance of the electronic component 40 by the adverse effects of the bead core made of metal. In addition, since the electronic component unit 50 is in a state pasted to the tire inner cavity side 29C of the inner liner 29, manufacturing is easy.

(2) In the tire 1 according to the present embodiment, when drawing a normal line from the tire inner cavity side 29C of the inner liner 29 in a tire-width direction cross-sectional view, and defining a portion at which a distance from the tire inner cavity side 29C of the inner liner 29 to the tire outer surface becomes longest as a bead thickest part T, the electronic component unit 50 is arranged more to an inner side in the tire-radial direction than a position P2 of the tire inner cavity side of the inner liner 29 configuring the bead thickest part T. In the case of pasting the electronic component uni50 at such a region, force such that compresses and force such that pulls the electronic component unit 50 hardly occurs even when the tire 1 deforms. In other words, force such that the electronic component unit 50 detaches from the tire inner cavity side 29C of the inner liner 29 hardly occur.

(3) The electronic component unit 50 according to the present embodiment is arranged more to the inner side in the tire-radial direction than the tire-radial direction position of the tire-radial direction outside end 22A of the bead filler 22. Since the electronic component unit 50 thereby comes to be arranged at the inner side in the tire-width direction of the bead filler 22 configured from high modulus rubber or in the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs.

(4) The bead 11 according to the present embodiment further has the rim strip rubber 32 arranged at the outer side in the tire-width direction of the bead filler 22, and the electronic component unit 50 is arranged more to the inner side in the tire-radial direction than the tire-radial direction position of the tire-radial direction outside end 32A of the rim strip rubber 32. Since the electronic component unit 50 thereby comes to be arranged at the inner side in the tire-width direction of the rim strip rubber 32 configured by rubber of high modulus or the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs.

(5) The electronic component unit 50 of the tire 1 according to the present embodiment has the electronic component 40 and the flexible film 45 (the resin film 45) which covers at least part of the electronic component. It is thereby possible to thin the thickness of the electronic component unit 50. In addition, handling of the electronic component unit becomes easy.

In addition, the tire 1 of the present embodiment has the following configuration.

(1) The electronic component 40 of the tire 1 according to the present embodiment has the IC chip 42 and the antenna 43, in which the antenna 43 is a printed antenna configured form a conductive material printed in a predetermined pattern on the flexible substrate 41. It is thereby possible to thin the thicknesses of the electronic component 40 and electronic component unit 50.

(2) The antenna 43 of the electronic component 40 of the tire 1 according to the present embodiment has a longitudinal direction, and the electronic component unit 50 is arranged in an orientation such that the longitudinal direction of the antenna 43 faces a direction corresponding to the circumferential direction of the tire 1. Stress thereby hardly acts on the electronic component 40, even if the tire 1 deforms during tire use.

In addition, according to the manufacturing method of the tire 1 of the present embodiment, the following effects are exerted.

(1) The manufacturing method of the tire 1 according to the present embodiment is a manufacturing method of the tire 1 including rubber members configuring the tire 1 and the electronic component unit 50 installed to the rubber members, and includes: the adhesive coating step of coating the vulcanizing adhesive 60 onto the electronic component unit 50; the drying step of drying the electronic component unit 50 on which the vulcanizing adhesive 60 was coated, and preparing a dried electronic component unit 50 which has been dried for at least a predetermined time; the electronic component unit installation step of installing the dried electronic component unit 50 onto the rubber members prior to vulcanization; and the vulcanization step of vulcanizing the green tire including the rubber members to which the dried electronic component unit 50 was installed. The work for pasting the electronic component unit 50 thereby becomes favorable. The dried vulcanizing adhesive 60 temporarily adheres to the rubber member. Consequently, it is possible to improve the workability of the work for pasting the electronic component unit 50. In addition, the dried vulcanizing adhesive 60 integrates with the rubber member in the subsequent vulcanization step. Consequently, it is possible to improve the joining strength between the electronic component unit 50 and rubber member.

(2) The manufacturing method of the tire 1 according to the present embodiment dries a plurality of electronic component units 50 on which the vulcanizing adhesive 60 was coated in the drying step, and picks up a dried electronic component unit 50 which has been dried for at least a predetermined time from among the plurality of electronic component unit 50 on which the vulcanizing adhesive 60 was coated, and installs to the rubber member in the electronic component unit installation step. Even in the case of providing a step of drying, it is thereby possible to suppress a decline in yield cycle time.

(3) With the manufacturing method of the tire 1 according to the present embodiment, in the electronic component unit installation step, the dried electronic component unit 50 is distinguished from the electronic component units 50 for which the drying time has not elapsed the predetermined time, and is picked out. Even in the case of providing a step of drying, it is thereby possible to suppress a decline in yield cycle time.

(4) With the manufacturing method of the tire 1 according to the present embodiment, in the adhesive coating step, the vulcanizing adhesive 60 is coated so that the thickness after the vulcanization step becomes at least 10 μm and no more than 30 μm, and the predetermined time in the drying step is a tire of at least 1 hour. It is thereby possible to dry the vulcanizing adhesive so as to establish a state which easily pastes the electronic component unit 50 in the subsequent electronic component unit installation step.

(5) In the manufacturing method of the tire 1 according to the present embodiment, the rubber member is the inner liner 29, and in the electronic component unit installation step, the dried electronic component unit 50 is pasted to the tire inner cavity side 29C of the inner liner 29 prior to vulcanization. It is thereby possible to appropriately install the electronic component unit 50 at the tire inner cavity side 29C of the inner liner 29.

(6) In the manufacturing method of the tire 1 according to the present embodiment, the antenna 43 has a longitudinal direction, and in the electronic component unit installation step, the electronic component unit 50 is installed to the rubber member so that the longitudinal direction of the antenna 43 faces a direction corresponding to the circumferential direction of the tire 1. Stress thereby hardly acts on the electronic component 40, even if the tire 1 deforms during tire use.

Second Embodiment

Next, a tire 1 according to a second embodiment will be explained while referencing FIGS. 8 and 9. It should be noted that, in the following explanation, the same reference symbols are assigned to configurations which are identical to the first embodiment, and detailed explanations thereof will be omitted. The tire 1 of the present embodiment includes a steel side ply 37 serving as a metal reinforcement layer.

FIG. 8 is a view showing a half section in a tire-width direction of the tire 1 according to the present embodiment. FIG. 9 is an enlarged cross-sectional view in the vicinity of a tire-radial direction inside region of the bead 11 and side-wall 12 of the tire 1 of the present embodiment shown in FIG. 8.

The tire 1 of the present embodiment includes a steel side ply 37 serving as a metal reinforcement layer between the ply folding part 25 and bead filler 22. In addition, a chafer 31 is provided to be separated as an independent member from the rim strip rubber 32. In addition, the lamination sequence of the tread rubber 28 and side-wall rubber 30 differs in the movement region of the side-wall 12 and tread 13. In the present embodiment, the side-wall rubber 30 and tread rubber 28 are in a state layered in order, on the tire outer surface side of the carcass ply 23.

The chafer 31 is provided so as to cover the carcass ply 23 provided around the bead core 21. In more detail, the chafer 31 is provided so as to cover the inner side in the tire-width direction, inner side in the tire-radial direction and outer side in the tire-width direction of the carcass ply 23 at the periphery of the bead core 21. The chafer 31 has a first end 31A arranged on the outer side in the tire-width direction of the ply folding part 25 of the carcass ply 23, and a second end 31C arranged at the inner side in the tire-width direction of the ply body 24 of the carcass ply 23. The first end 31A of the chafer 31 is arranged so as to be sandwiched between the ply folding part 25 of the carcass ply 23 and the rim strip rubber 32. The second end 31C of the chafer 31 is arranged so as to be sandwiched between the ply body 24 of the carcass ply 23 and the inner liner 29. The chafer 31 is configured from rubber into which fibers were kneaded, or rubber of high modulus, for example, and the relative strength is high among constituent members constituting the tire 1. For example, the strength is higher than the inner liner 29 and side-wall rubber 30 described later.

The rim strip rubber 32 of the present embodiment is arranged on the outer side in the tire-width direction of the chafer 31 and the ply folding part 25 of the carcass ply 23, and upon the tire 1 being mounted to a wheel, the outer side in the tire-width direction thereof makes contact with the rim 100 of the wheel. The rim strip rubber 32 has a tire-radial direction outside end 32A and tire-radial direction inside end 32B. The outer side in the tire-radial direction of this rim strip rubber 32 connects to the side-wall rubber 30. In this way, in the present embodiment, the chafer 31 is provided to be separated as an independent member from the rim strip rubber 32.

The steel side ply 37 serving as a metal reinforcement layer is arranged between the ply folding part 25 of the carcass ply 23, and the outer side in the tire-width direction of the bead filler 22. The steel side ply 37 has a function of reinforcing the bead 11. The steel side ply 37 has a tire-radial direction outside end 37A and a tire-radial direction inside end 37B. In the present embodiment, the tire-radial direction outside end 37A of the steel side ply 37 is more to an outer side in the tire-radial direction than the tire-radial direction outside end 22A of the bead filler 22, and located more to the inner side in the tire-radial direction than the end 25A of the ply folding part 25. The steel side ply 37 has a portion arranged to be sandwiched between the outer side in the tire-width direction of the bead core 21 and the ply folding part 25, and a portion arranged to be sandwiched between the outer side in the tire-width direction of the bead filler 22 and the ply folding part 25. In the present embodiment, the steel side ply 37 further has a portion arranged to be sandwiched between the ply body 24 and the ply folding part 25.

The steel side ply 37 of the present embodiment is configured by a metal fiber cord layer containing metal fibers. In more detail, the steel side ply 37 is configured to include a plurality of metal cords formed by twisting a plurality of metal fibers, and topping rubber integrated by coating the plurality of metal cords.

In the present embodiment, the electronic component unit 50 has at least a part thereof arranged at a tire-radial direction position distanced at least 5.0 mm from the tire-radial direction outside end 21A of the bead core 21 to the outer side in the tire-radial direction. When explained using FIGS. 8 and 9, the electronic component unit 50 of the present embodiment is arranged more to an outer side in the tire-radial direction than the tire-radial direction position P1 distanced by a predetermined distance L1 from the tire-radial direction outside end 21A of the bead core 21 to the outer side in the tire-radial direction, on the tire inner cavity side 29C of the inner liner 29. Herein, the predetermined distance L1 is 5.0 mm. It should be noted that an entire portion of the electronic component 40 is preferably arranged at a tire-radial direction position distanced at least 5.0 mm to the outer side in the tire-radial direction from the tire-radial direction outside end 21A of the bead core 21.

In the present embodiment, the electronic component unit 50 is arranged more to the inner side in the tire-radial direction than a tire-radial direction position P3 of the tire-radial direction outside end 37A of the steel side ply 37, on the tire inner cavity side 29C of the inner liner 29. For example, at least part of the electronic component unit 50 is arranged more to the inner side in the tire-radial direction than the tire-radial direction position P3 of the tire-radial direction outside end 37A of the steel side ply 37. In other words, at least part of the electronic component unit 50 is arranged within a region of the range L3 shown in FIGS. 8 and 9. More preferably, the entire portion of the electronic component 40 is arranged within the region of range L3. Since the electronic component unit 50 comes to be arranged at the inner side in the tire-width direction of the steel side ply 37 or the vicinity thereof, the deformation of the inner liner 29 at the periphery of the electronic component unit 50 becomes smaller. Consequently, the force such that the electronic component unit 50 detaches from the tire inner cavity side 29C of the inner liner 29 hardly occurs.

It should be noted that, in the present embodiment, the electronic component unit 50 is arranged more to the inner side in the tire-radial direction than the tire-radial direction position of the tire-radial direction outside end 22A of the bead filler 22. By at least part of the electronic component unit 50 being arranged more to the inner side in the tire-radial direction than the tire-radial direction position of the tire-radial direction outside end 22A of the bead filler 22, since the electronic component unit 50 comes to be arranged at the inner side in the tire-width direction of the bead filler 22 configured from high modulus rubber or in the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs. It should be noted that the entire portion of the electronic component 40 is preferably arranged more to the inner side in the tire-radial direction than the tire-radial direction position of the tire-radial direction outside end 22A of the bead filler 22.

It should be noted that, in the present embodiment, the electronic component unit 50 is arranged more to the inner side in the tire-radial direction than the tire-radial direction position of the tire-radial direction outside end 32A of the rim strip rubber 32. By at least part of the electronic component unit 50 being arranged more to the inner side in the tire-radial direction than the tire-radial direction position of the tire-radial direction outside end 32A of the rim strip rubber 32, since the electronic component unit 50 comes to be arranged at the inner side in the tire-width direction of the rim strip rubber 32 configured by rubber of high modulus or the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs. It should be noted that the entire portion of the electronic component 40 is preferably arranged more to the inner side in the tire-radial direction than the tire-radial direction position of the tire-radial direction outside end 32A of the rim strip rubber 32.

According to the tire 1 of the present embodiment, the following effect is exerted.

(1) In the tire 1 of the present embodiment, the steel side ply 37 is provided as a metal reinforcement layer between the ply folding part 25 and bead filler 22, and the electronic component unit 50 is arranged more to the inner side in the tire-radial direction than the tire-radial direction position P3 of the tire-radial direction outside end 37A of the steel side ply 37. Since the electronic component unit 50 thereby comes to be arranged at the inner side in the tire-width direction of the steel side ply 37 or in the vicinity thereof, deformation of the inner liner 29 at the periphery of the electronic component unit 50 becomes smaller. Consequently, force such that the electronic component unit 50 detaches from the tire inner cavity side 29C of the inner liner 29 hardly occurs.

Third Embodiment

Next, a tire 1 according to a third embodiment will be explained while referencing FIGS. 10A and 10B. It should be noted that, in the following explanation, the same reference symbols are assigned to configurations which are identical to the first embodiment, and detailed explanations thereof will be omitted. The electronic component unit 50 of the present embodiment has a curved shape formed in a state adhered with the inner liner 29.

Figure 10A:
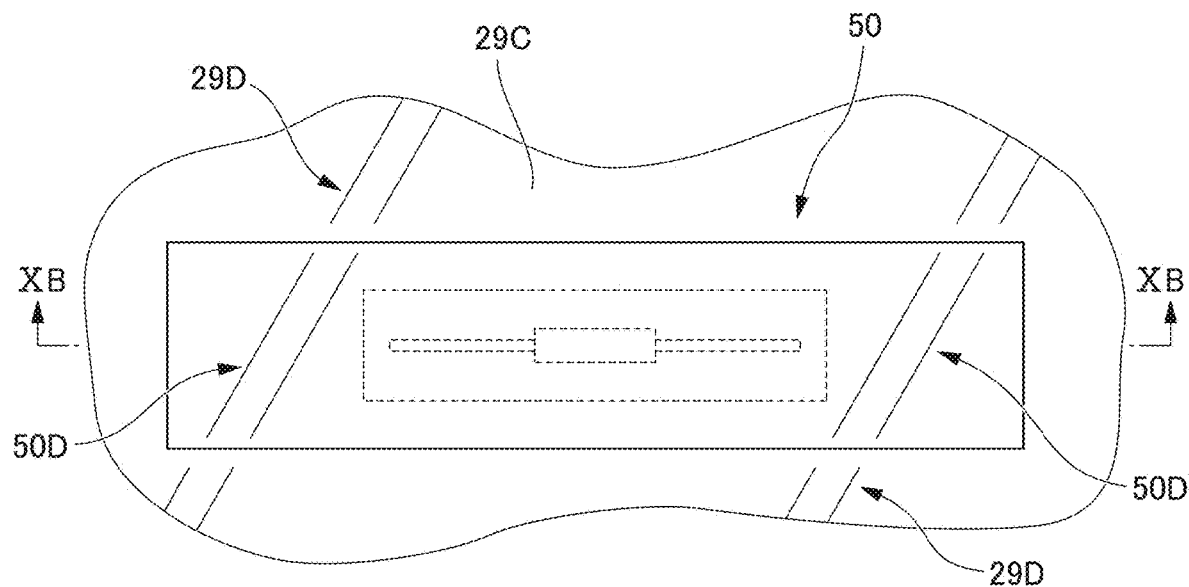
FIG. 10A is a view showing an electronic component unit pasted to an inner liner of a tire according to a third embodiment.
Figure 10B:
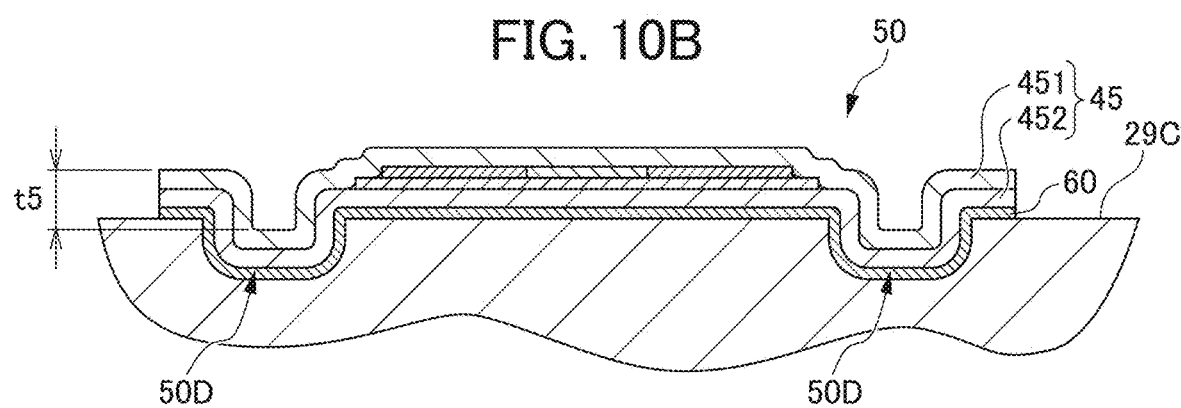
FIG. 10B is a cross-sectional view showing a cross section along the line XB-XB in FIG. 10A.

FIG. 10A is a view showing the electronic component unit 50 pasted to the inner liner 29 of the tire according to the present embodiment. FIG. 10B is a cross-sectional view showing a cross section along the line XB-XB in FIG. 10A.

The electronic component unit 50 of the present embodiment has a curved shape formed in a state adhered with the inner liner 29. In FIG. 10B, a projecting part 50D protruding to a tire outer surface side is formed as this curved shape. In other words, the projecting part 50D formed so as to sink into the inner liner 29 is formed. The adhesion between the inner liner 29 and electronic component unit 50 improves, and it is thereby possible to suppress detaching of the electronic component unit 50.

It should be noted that the step dimension t5 of the curved shape is preferably larger than the thickness of the vulcanizing adhesive 60. The adhesion between the inner liner 29 and electronic component unit 50 thereby further improves. In addition, the step dimension t5 of the curved shape may be larger than the thickness of the flexible film 45 constituting the electronic component unit 50. The adhesion between the inner liner 29 and electronic component unit 50 thereby further improves.

Next, a step of forming the curved shape in the electronic component unit 50 will be explained. This curved shape is formed in the vulcanization step S14.

In the present embodiment, similarly to the first embodiment, the dried electronic component unit 50 is installed to the rubber member prior to vulcanization in the electronic component unit installation step S24. Prior to the vulcanization step S14, it is a state in which the electronic component unit 50 is installed to the green tire.

In the vulcanization step S14, the green tire to which the electronic component unit 50 was installed is vulcanized by a vulcanization device.

During this vulcanization, a bladder which is a bag-like pressing member is arranged at an inside space (inner cavity) of the green tire. The bladder inflates within the inside space of the green tire, by high-temperature, high-pressure pressurizing medium being supplied inside. The tire inner cavity side 29C of the inner liner 29 is thereby pressurized in the direction of the outer mold (tire outer surface side), while being heated.

Herein, a projection of predetermine height is provided to the outer surface of the bladder. The projection of this bladder thereby presses the electronic component unit 50 pasted to the inner cavity surface 29C of the inner liner 29. As a result thereof, after vulcanization, the projecting part 50D serving as the curved shape is formed at the electronic component unit 50. In addition, a groove 29D is formed in the inner cavity surface 29C of the inner liner 29. It should be noted that the height of the projection provided to the bladder is set so that the step dimension of the curved shape of the electronic component unit 50 becomes a desired dimension.

It should be noted that the curved shape may be a projecting part which protrudes to the side of the tire inner cavity. The adhesion between the inner liner 29 and electronic component unit 50 also thereby improves, and it is possible to suppress detaching of the electronic component unit 50. This case provides a groove to the outer surface of the bladder. It is thereby possible to form in the electronic component unit 50 a projecting part protruding to the side of the tire inner cavity, as the curved shape formed in a state adhering with the inner liner 29. It should be noted that the curved shape formed in the electronic component unit 50 is not limited to a projecting part, and may be a so-called step-bend (Z-bend) shape or the like.

In this way, it becomes possible to form a curved shape in the electronic component unit 50.

According to the tire 1 of the present embodiment, the following effects are exerted.

(1) The electronic component unit 50 of the present embodiment has a curved shape formed in a state adhering with the inner liner 29. The adhesion between the inner liner 29 and electronic component unit 50 thereby improves, and it is possible to suppress detaching of the electronic component unit 50.

(2) The curved shape of the electronic component unit 50 of the present embodiment is a projecting part which protrudes to a side of the tire inner cavity or to a side of the tire outer surface. The adhesion between the inner liner 29 and electronic component unit 50 thereby improves, and it is possible to suppress detaching of the electronic component unit 50.

(3) The step dimension of the curved shape of the electronic component unit 50 of the present embodiment is greater than the thickness of the vulcanizing adhesive 60. It is thereby possible to further improve the adhesion between the inner liner 29 and electronic component unit 50.

(4) The manufacturing method of the tire 1 of the present embodiment forms a curved shape in at least part of the electronic component unit 50 in the vulcanization step. It is thereby possible to form a curved shape in at least part of the electronic component unit 50, without increasing the number of steps.

It should be noted that, although the tire of the present invention can be adopted as various types of tires such as for cars, light trucks, trucks and buses, it is particularly suitable as a tire of a truck, bus, etc. It should be noted that the present invention is not limited to the above-mentioned embodiments, and even if conducting modifications, improvements, etc. within a scope which can achieve the object of the present invention, it is also encompassed in the scope of the present invention.

What is claimed is:

1. A tire comprising:
    a pair of beads each having a bead core and a bead filler extending to an outer side in a tire-radial direction of the bead core;
    a carcass ply extending from one bead to another bead;
    an inner liner disposed at a tire inner cavity side of the carcass ply; and
    an electronic component unit adhered to a tire inner cavity side of the inner liner, and
    wherein the electronic component unit comprises an electronic component and at least one resin film covering at least part of the electronic component, and the entire electronic component is disposed at a tire-radial direction position distanced at least 5.0 mm to an outer side in the tire-radial direction from a tire-radial direction outside end of the bead core;
    wherein the electronic component unit has a curved shape formed in a state adhering with the tire inner cavity side of the inner liner, and the curved shape comprises two protrusions protruding into the inner liner,
    wherein the tire further comprises a vulcanizing adhesive which bonds the inner liner to the curved shape of the electronic component unit, ensuring a seamless alignment of profiles of the inner liner, the vulcanizing adhesive, and the electronic component unit; and
    wherein an entire inner surface of the electronic component unit is adhered to the tire inner cavity side of the inner liner;
    wherein the at least one resin film is configured by a first resin film and a second resin film,
    wherein the vulcanizing adhesive, the second resin film, the electronic component and the first resin film are disposed in order on the tire inner cavity side of the inner liner, and
    wherein a thickness of each protrusion protruding into the inner liner is larger than a total thickness of the first resin film and the second resin film.

2. The tire according to claim 1 wherein, when drawing a normal line from the tire inner cavity side of the inner liner in a tire-width direction cross-sectional view, and defining a portion at which a distance from the tire inner cavity side of the inner liner to the tire outer surface becomes longest as a bead thickest part, the electronic component unit is disposed closer to an inner side in the tire-radial direction than a position of the tire inner cavity side of the inner liner configuring the bead thickest part.

3. The tire according to claim 1, wherein the electronic component unit is disposed closer to an inner side in the tire-radial direction than a tire-radial direction outside end of the bead filler.

4. The tire according to claim 1, wherein the bead further has rim strip rubber disposed at an outer side in the tire-width direction of the bead filler, and
    wherein the electronic component unit is disposed closer to an inner side in the tire-radial direction than the tire-radial direction position of a tire-radial direction outside end of the rim strip rubber.

5. The tire according to claim 1, wherein the carcass ply includes a ply body extending from one bead to another bead, and a ply folding part which is folded back around the bead core,
    wherein a metal reinforcement layer is provided between the ply folding part and the bead filler, and
    wherein the electronic component unit is disposed closer to an inner side in the tire-radial direction than a tire-radial direction position of a tire-radial direction outside end of the metal reinforcement layer.

6. The tire according to claim 1, wherein the electronic component has an IC chip and an antenna, the antenna being a print antenna configured by a conductive material printed in a predetermined pattern on a flexible substrate.

7. The tire according to claim 6, wherein the antenna has a longitudinal direction, and
    wherein the electronic component unit is disposed with an orientation such that the longitudinal direction of the antenna faces a direction corresponding to a circumferential direction of the tire.

8. The tire according to claim 1,
    wherein a thickness of the vulcanizing adhesive is no more than 30 μm.

9. The tire according to claim 8, wherein a hardness of the vulcanizing adhesive is at least as much as a hardness of the inner liner, and no more than a hardness of the at least one resin film.

10. The tire according to claim 1, wherein the curved shape further comprises a projecting part which protrudes to a side of the tire inner cavity.

11. The tire according to claim 1,
    wherein a step dimension of the curved shape is larger than the thickness of the vulcanizing adhesive.

12. The tire according to claim 10,
    wherein a step dimension of the curved shape is larger than the thickness of the vulcanizing adhesive.

13. The tire according to claim 8, wherein the thickness of the vulcanizing adhesive is thinner than the thickness of the at least one resin film.

* * * * *